US012675391B1

(12) United States Patent
Albarghouthi et al.

(10) Patent No.: US 12,675,391 B1
(45) Date of Patent: Jul. 7, 2026

(54) MINIMAL TRUST DEBUGGING

(71) Applicant: Amazon Technologies, Inc., Seattle, WA (US)

(72) Inventors: Aws Albarghouthi, Middleton, WI (US); Miryung Kim, Los Angeles, CA (US); Temesghen Kahsai Azene, Union City, CA (US); Antonio Filieri, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 18/349,601

(22) Filed: Jul. 10, 2023

(51) Int. Cl.
    *G06F 11/3698*        (2025.01)
    *G06F 11/362*         (2025.01)
    *G06F 21/62*          (2013.01)

(52) U.S. Cl.
    CPC ...... G06F 11/3698 (2025.01); G06F 11/3624 (2013.01); G06F 21/6281 (2013.01)

(58) Field of Classification Search
    None
    See application file for complete search history.

(56) References Cited

U.S. PATENT DOCUMENTS

| | | | |
|---|---|---|---|
| 8,166,313 | B2 | 4/2012 | Fedtke |
| 2010/0162050 | A1* | 6/2010 | Cathro .................. G06F 11/261 |
| | | | 714/E11.206 |

| | | | | |
|---|---|---|---|---|
| 2015/0058826 | A1* | 2/2015 | Hu ...................... | G06F 11/3698 |
| | | | | 717/128 |
| 2022/0035730 | A1* | 2/2022 | Dundigalla ........... | G06F 11/368 |
| 2022/0100636 | A1* | 3/2022 | Jothiprakash ....... | G06F 11/3612 |
| 2022/0138077 | A1* | 5/2022 | Ozel ...................... | G06F 3/016 |
| | | | | 714/45 |
| 2024/0160530 | A1* | 5/2024 | Das ...................... | G06F 11/0778 |
| 2024/0291863 | A1* | 8/2024 | Cohen ................. | H04L 63/1425 |
| 2024/0362107 | A1* | 10/2024 | Jain ...................... | G06F 11/3476 |

* cited by examiner

*Primary Examiner* — Lewis A Bullock, Jr.
*Assistant Examiner* — Mark A Gooray
(74) *Attorney, Agent, or Firm* — S. Scott Foster; Kowert, Hood, Munyon, Rankin & Goetzel, P.C.

(57) ABSTRACT

A data anonymization service of an application development service is configure to protect sensitive data while providing data context in the reproduction of application events. Upon detection of an execution symptom within a production application, data required to reproduce the symptom is collected as input to an anonymizer to facilitate minimal-trust analysis of the symptom. The data may first be minimized to eliminate data elements not needed to reproduce the symptom, the data elements are identified that are essential to reproduce the symptom are determined to contain sensitive data according to client-provided rules. These identified elements are then transformed to anonymize the sensitive data while preserve reproducibility of the symptom. A modified data set including the transformed data elements may then be provided to an application development service for analysis.

20 Claims, 7 Drawing Sheets sensitive data <u>300</u>

```
{
  "Version": "2012-10-17",
  "Statement": [
    {
      "Sid": "CompanyXPolicyY",
      "Principal": "arn:iam::123456789012:user/employeeΩ"
      "Action": "DeleteObject",
      "Resource": "arn:superSecretBucket/obj"
    }
  ]
}
``` modified data <u>310</u>

```
{
  "Version": "2012-10-17",
  "Statement": [
    {
      "Sid": "*",
      "Principal": "Ω"
      "Action": "*",
      "Resource": "*"
    }
  ]
}
```

*FIG. 3*

MINIMAL TRUST DEBUGGING

BACKGROUND

Application development may require various operations to be performed after deployment such as debugging, analysis and profiling of production code. Complex software systems frequently require software developers to inspect inputs that manifest software bugs and performance anomalies. This can be difficult in settings where the inputs are confidential, such as when clients of the software developers provide information, such as authentication credentials, that must not be disclosed to third parties.

BRIEF DESCRIPTION OF DRAWINGS

FIG. 3 illustrates example data elements to be anonymized to provide minimal trust debugging, according to some embodiments.

Figure 1:
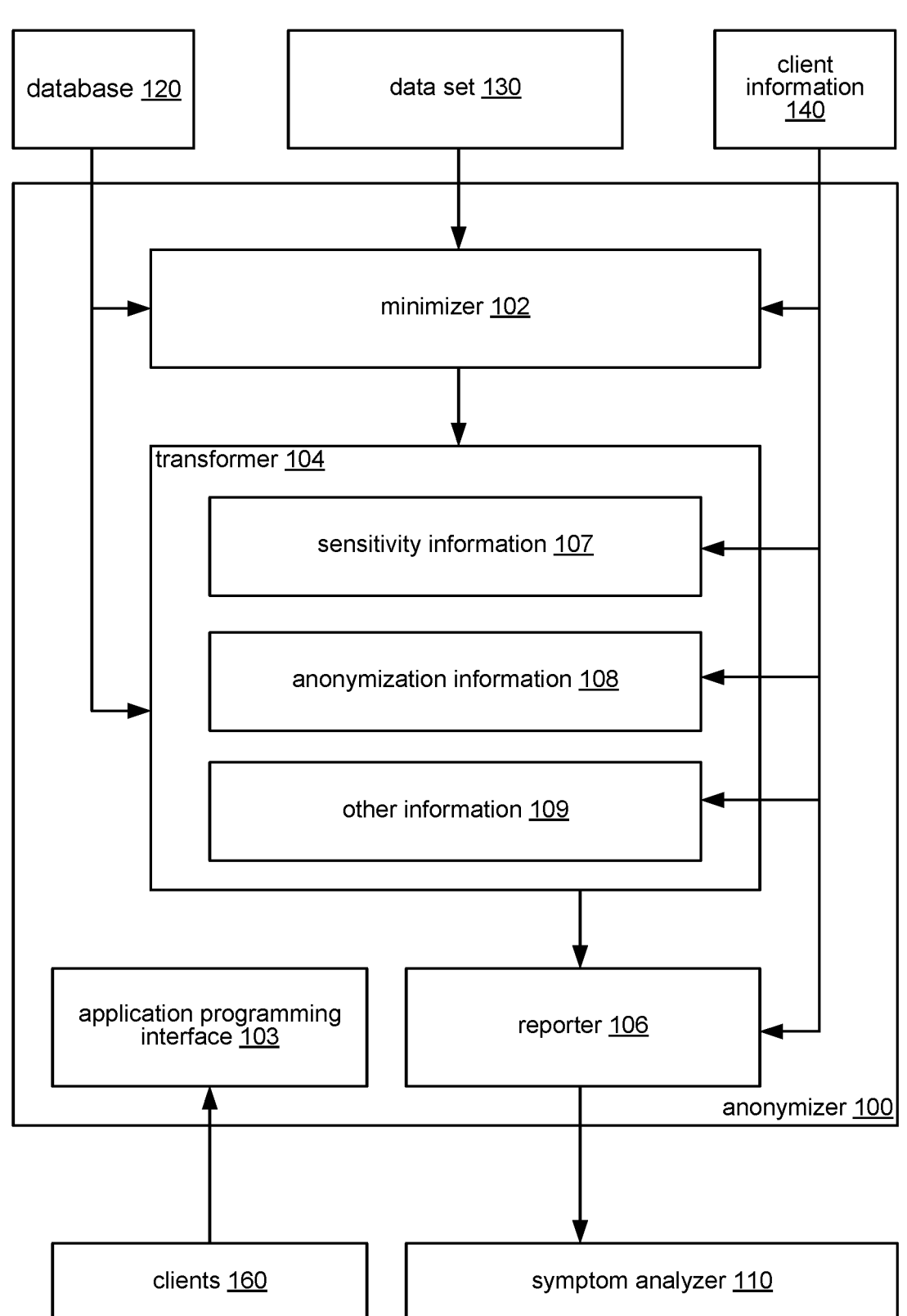
FIG. 1 illustrates an example anonymizer enabling minimal trust debugging, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Application development may require various operations to be performed after deployment such as debugging, analysis and profiling of production code. Complex software systems frequently require software developers or service owners to inspect inputs that manifest software bugs and performance anomalies. This can be difficult in settings where the inputs are confidential, such as when clients of the software developers provide information, such as authentication credentials, that must not be disclosed to third parties.

A novel debugging and development technique is disclosed in which software developers may debug their systems while minimizing disclosure of the confidential inputs, a technique known as minimal-trust debugging. A developer may be provided access to a sufficiently obfuscated or anonymized input that only captures the "essence" of the bug without disclosing sensitive or confidential information of the service owner's users. Minimal-trust debugging is enabled via an iterative process that redacts and transforms a confidential input to arrive at an obfuscated subset that manifests the bug. Specifically, this process is initiated when a bug or execution symptom is observed in production or by the user. The minimal-trust debugging process generates an obfuscated version of the input that is sent to the developer for inspection. In addition to enabling debugging in a minimal-trust setting, the iterative redaction and transformation process at the heart of minimal-trust debugging makes it easier for a developer to debug the system, because the input they see is a much smaller and doesn't include the extraneous pieces of the original input that caused the bug.

A data anonymization service of an application development service is configure to protect sensitive or confidential data while providing data context in the reproduction of application events. Upon detection of an execution symptom within a production application, data required to reproduce the symptom is collected as input to an anonymizer to facilitate minimal-trust analysis of the symptom. The data may first be minimized to eliminate data elements not needed to reproduce the symptom, the data elements are identified that are essential to reproduce the symptom are determined to contain sensitive data according to client-provided rules. These identified elements are then transformed to anonymize the sensitive or confidential data while preserve reproducibility of the symptom. A modified data set including the transformed data elements may then be provided to an application development service for analysis.

Figure 2:
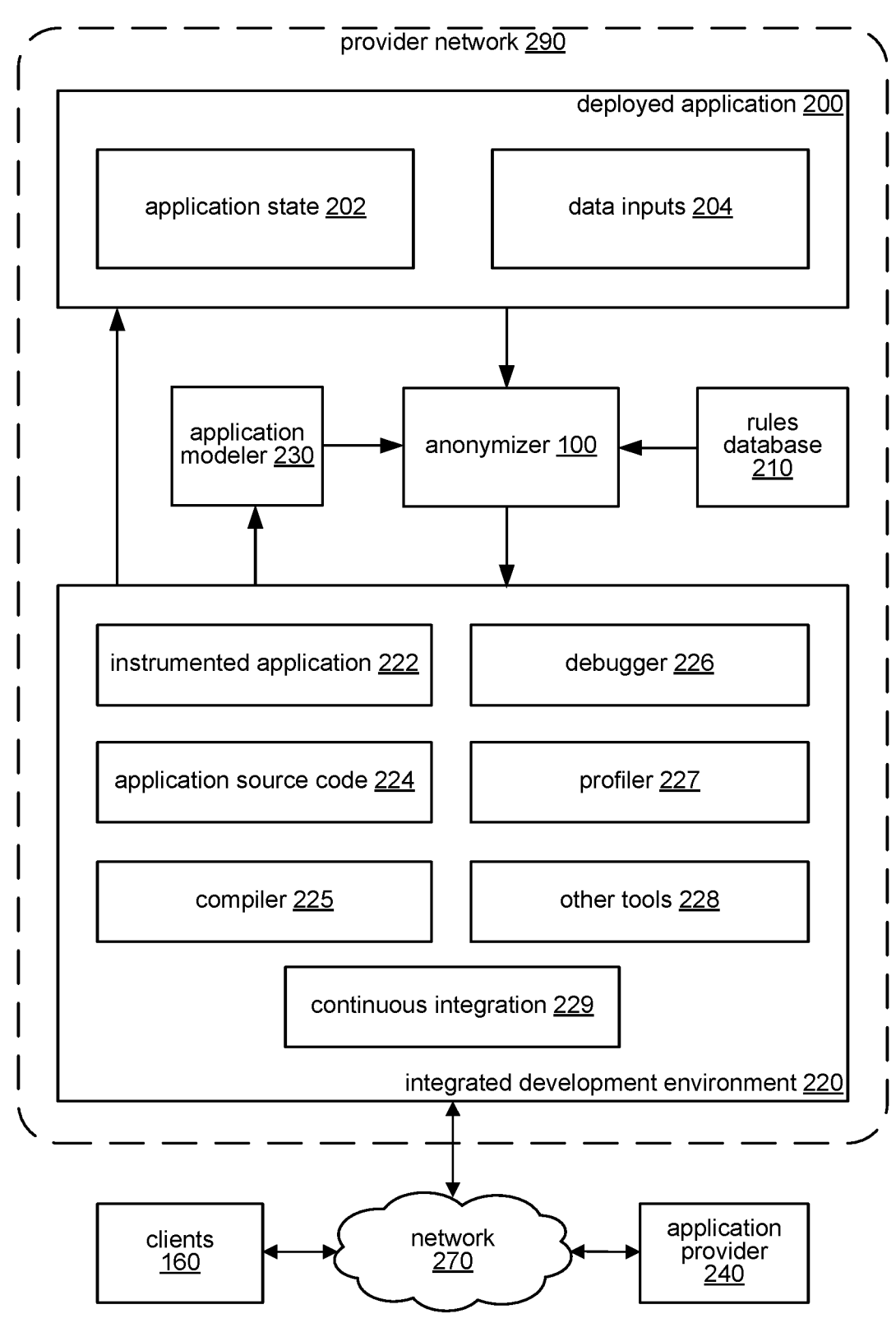
FIG. 2 illustrates an example network-based software development system that employs an anonymizer to enable minimal trust debugging, according to some embodiments.

FIG. 1 illustrates an example anonymizer enabling minimal trust debugging, according to some embodiments. FIG. 2 then provides an example of integration of the anonymizer 100 of FIG. 1 into a software development process. Clients 160 may submit requests for anonymization of data sets to an anonymizer 100 by providing a data set 130. Examples of this data set, and circumstances in which such data sets may arise, are discussed in further detail below in FIG. 2. A client 160 may submits a data set in a number of ways in various embodiments, for example through an application programming interface (API) 103 or other programmatic interfaces, through a graphical user interface (GUI) or command line interface or through an automation script. The data sets may be provided in any number of ways. For example, the data may be provided in the form of a binary or human-readable file for which a schema is either known or integrated. Examples may include JavaScript Object Notation (JSON) schema records, Yet Another Markup Language (YAML) schema records, Standard Generalized Markup Language (SGML) schema records, Extensible Markup Language (XML) schema records, CSV entries or other convenient formats. In addition, a data set may include input files provided to an application associated with the data set, and these file may be similarly encoded such as by using JSON, XML, CSV, and so on. It should be understood that these are merely examples of encoding schemes, and thus the examples are not intended to be limiting and data sets may be provided in any number of manners in various embodiments.

In addition, a client 160 may provide client information 140 which may be used in various stages of the anonymizing process. Examples of such rules may include rules defining sensitivity of user data, rules for rewriting data elements within the data set to provide anonymity, rules for evaluating execution symptoms, rules for reporting results of an anonymizing process, and so on. In addition, additional rules and information to assist anonymizing may be provided using a database 120, in some embodiments. Examples of information provided by the database 120 may be similar to those of client information 140.

Anonymizer 100 may receive a data set 130 and a minimizer 102. The minimizer 102 may reduce the amount of data contained in the data set by removing data not essential in reproducing a symptom identified as reproducible using the data set. To accomplish minimization, the minimizer may employ a number of techniques such as delta-debugging and feedback guided iterative search procedures such as mutational fuzzing, or heuristic search algorithms such as Monte Carlo tree search. These techniques may iteratively transform the input data set and check if the indicated symptom is still reproducible, in various embodiments. The minimizer 102 may employ a production version of a system or application which displays the reproducible symptom. This may be in the form of a production application, including the application for which the user obtained the data set 130, a local version of the production application, an instrumented or debug version of the production application or an application or system simulator or modeler, in various embodiments.

After completion of minimization, or concurrent with minimization in some embodiments, the data set may be further processed by a transformer 104 according to various rules or information, including sensitivity information 107, anonymization information 108 and other information 109, to transform and anonymize various elements of the data set 130. As the remaining elements are or have been determined to be essential in reproduction of the symptom, the transformer 104 may identify individual elements that are confidential and apply an anonymizing transform to those elements. To accomplish this, the transformer 104 may employ sensitivity information 107 obtained from the client via client information 140 or from the database 120, in various embodiments. Thus, data elements may be identified as sensitive through identification by the client or by broader understanding of data types used as input to the application exhibiting the symptom. Examples of sensitive or confidential data requiring anonymizing may include identity and access management (IAM) policies, data-storage policies, SQL queries, database data fields, container configurations, virtual private network (VPN) and virtual private cloud (VPC) configurations, code snippets, Boolean satisfiability (SAT/SMT) queries, and so on. These example element types are not intended to be limiting and any number of element types may be envisioned.

Once an element is identified as sensitive, the element may be transformed to provide anonymity with the assistance of anonymization information 108. This information 108 may be obtained from the client via client information 140 of from the database 120, in various embodiments. The identified data element may be iteratively transformed and application configured with the transformed element to verify that the symptom remains reproducible. The transformer 104 may also employ a production version of a system or application which displays the reproducible symptom for this purpose. As discussed earlier, this may be in the form of a production application, including the application for which the user obtained the data set 130, a local version of the production application, an instrumented or debug version of the production application or an application or system modeler, in various embodiments.

Once elements identified as sensitive or confidential have been obfuscated to the extent possible while preserving the ability to reproduce the desired symptom, the modified data set may be prepared for export along with a report generated by the reporter 106, in some embodiments. As some data elements may not be successfully anonymized or may be only partly obscured, the reporter 106 may generate a report that includes a confidence measure. This confidence measure may include a size minimization guarantee which implies that removing any segment from the obfuscated input no longer produces the same error; an information leakage estimate and an information content score which measures the surprise value of an obfuscated outcome against a large benchmark of down-classified data. The modified data set ensures that if a system exhibits a specific symptom, the same system configured with the modified data set will also exhibit the system, reducing time to fix critical issues. The modified data set and generated report with confidence measure may then be supplied for use with a symptom analyzer 110. An example of the symptom analyzer 110 is provided below in FIG. 2.

FIG. 2 illustrates an example network-based software development system that employs an anonymizer to enable minimal trust debugging, according to some embodiments. An anonymizer 100, as discussed in FIG. 1, may be employed to obscure data inputs 204 to a deployed or production application 200 that exhibits an execution symptom such as a processor exception, memory access exception or other execution exception or a detected performance issue such as memory consumption, processor consumption, other resource consumption or an execution latency condition. These, however, are merely examples of execution symptoms and are not intended to be limiting.

Responsive to detecting an execution symptom, a data set, such as the data set 130 of FIG. 1, may be obtained from the deployed application 200, the data set including information regarding application state 202, including the execution symptom, and the data inputs 204. This data set may be presented to an application debugger, integrated development environment (IDE) 220 or other software development tool for analysis of the symptom. The IDE 200 and anonymizer may be services provided by a provider network 290 via a network 270, in some embodiments. The provider network is discussed in greater detail below in FIG. 6. The deployed application 200 may be published by an application provider 240 which may be a client of the provider network 290, and the symptom produced by the deployed application 200 may be caused by a data set of a client 160 which may be a client of the application provider 240 but not a client of the provider network 290, in some embodiments. As a result, sensitive or confidential data such as identity and access management (IAM) policies, data-storage policies, SQL queries, database data fields, container configurations, virtual private network (VPN) and virtual private cloud (VPC) configurations, code snippets, Boolean satisfiability (SAT/SMT) queries, and so on may not be revealed on the private network via the data set of the deployed application to protect the privacy of the clients 160.

The application provider 240 may publish the deployed application 200 using the IDE 220 by compiling application source code 224 using a compiler 225. In addition, the application provider 240 may create other versions of the deployed application 200, such as an instrumented application 222 usable by a debugger 226, profiler 227 or other tool 228, or an application modeler 230 usable by the anony-mizer 100 to ensure that the detected symptom remains reproducible.

The data set generated from the deployed application 200 may first be submitted to the anonymizer 100 to transform and minimize the data to protect privacy of client 160 data, in some embodiments. This process is discussed in greater detail in FIG. 1 above and in FIGS. 4 and 5 below. The anonymizer 100 may employ an application modeler 230 in the form of the deployed application 200, a local version of the deployed production application, an instrumented or debug version of the production application or an applica-tion or system modeler, in various embodiments. This appli-cation modeler 230 may be generated by the application provider 240 using the IDE 220, in various embodiments. The anonymizer 100 may also employ a rules database 210 that includes various rules such as those discussed regarding the database 120 and client information 140 of FIG. 1.

As discussed in FIG. 1, the anonymizer 100 may then process the received data set to generate a transformed data set and report that may then be submitted to the IDE 220 for further analysis of the symptom. Depending on the symp-tom, the application provider 240 may analyze and take actions for the symptom using tools such as the debugger 226, profiler 227 or other tools 228, depending on the particular symptom. The symptom and the transformed data set may further be recorded by a continuous integration module 229 of the IDE 220 in order to automate future triggering, detection and analysis of symptoms related to future deployments of the application. Furthermore, analysis of the symptom may be further supported by the confidence measure generated by the reporter 106 function of the anonymizer 100, in some embodiments.

FIG. 3 illustrates example data elements to be anony-mized to provide minimal trust debugging, according to some embodiments. A data set such as the data set 130 of FIG. 1 may include sensitive or confidential data 300. Shown is an example portion of an IAM policy, although the example shown is merely one example of sensitive or confidential data and is not intended to be limiting. Various embodiments may include any number and type of data considered data.

Included in the sensitive data 300 is a company name, a resource with a sensitive bucket name, and so forth. For the sake of illustration, assume that the detected symptom of an application using sensitive data 300 as input crashes in an IAM policy evaluation function due to the Greek letter in the "Principal" field. In other words, the only portion of the policy that is triggering a failure may be the character Ω (omega), which the evaluation engine did not anticipate. An anonymizer may then iteratively modify the sensitive data 300, reducing it to one that contains no sensitive information as shown as modified data 310, Observe how the fields have strings have been replaced with wildcards ("*").

Figure 4:
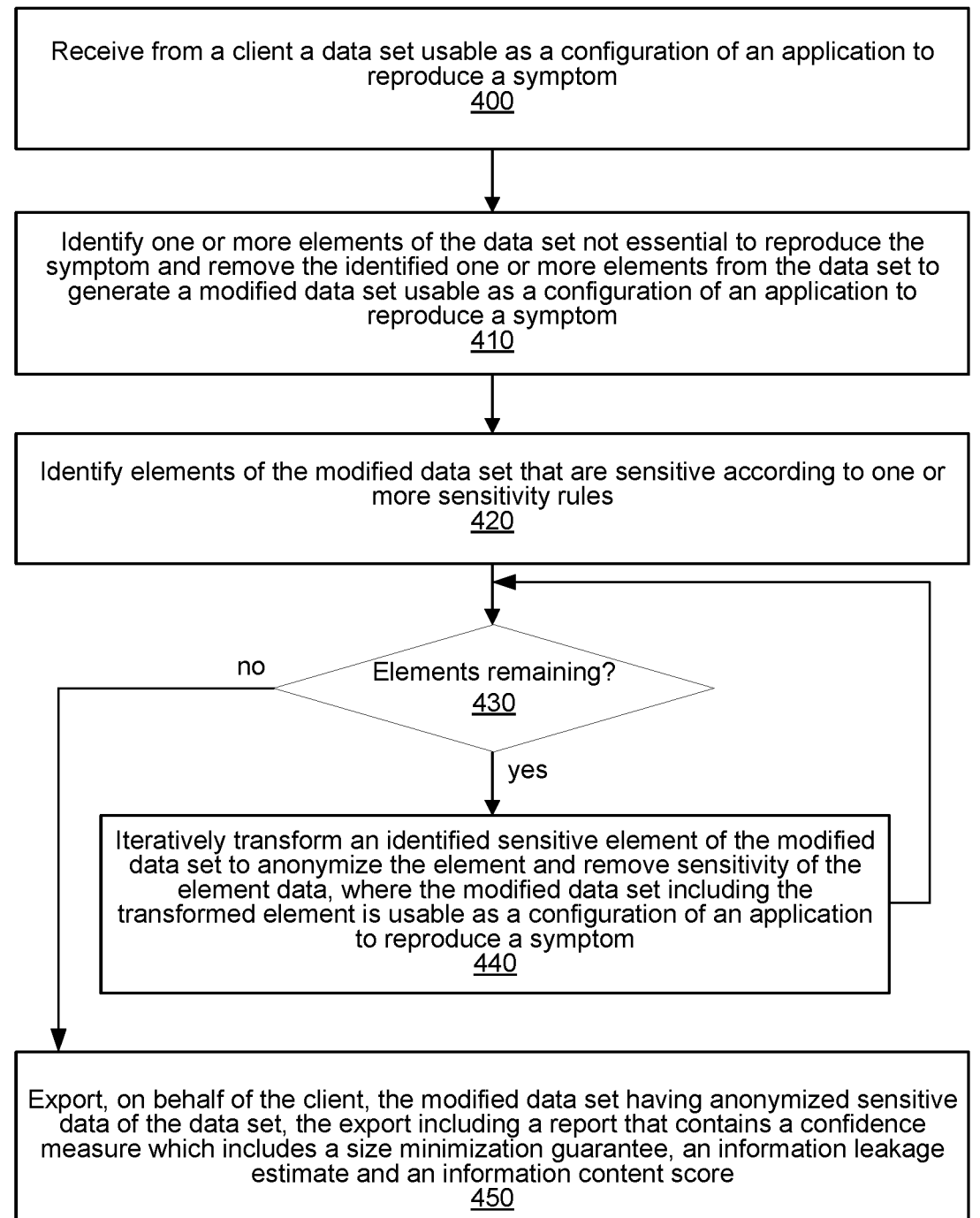
FIG. 4 illustrates a flowchart of an anonymizer process that enables minimal trust debugging, in some embodiments.

FIG. 4 illustrates a flowchart of an anonymizer process that enables minimal trust debugging, in some embodi-ments. The process begins at 400 where a data set, such as the data set 130 of FIG. 1, may be received from a client such as the client 160 of FIG. 1. The data set may be usable as a configuration to reproduce a symptom of an executable system or application, such as the deployed application 200 of FIG. 2.

Then, as shown in 410, the data set may be minimized by identifying one or more data elements or objects of the data set as not essential to reproduce the symptom. This identi-fying may employ, in some embodiments, a number of techniques such as delta-debugging and feedback guided iterative search procedures such as mutational fuzzing, or heuristic search algorithms such as Monte Carlo tree search. These techniques may iteratively transform the input data set and check if the symptom is still reproducible, in various embodiments. To verify that the symptom is still reproduc-ible, an application modeler may be employed. This may be in the form of a production application, including the application for which the user obtained the data set, a local version of a production application, an instrumented or debug version of a production application or an application or system modeler, in various embodiments.

After completion of minimization, or concurrent with minimization in some embodiments, as shown in 420 the data set may be further processed to anonymize various elements of the data set. First, individual elements that are sensitive or confidential may be identified. Sensitivity rules or other information, such as sensitivity information 107 of FIG. 1 obtained from a client, may be used to identify these sensitive or confidential data elements. Examples of sensi-tive or confidential data requiring anonymizing may include identity and access management (IAM) policies, data-stor-age policies, SQL queries, database data fields, container configurations, virtual private network (VPN) and virtual private cloud (VPC) configurations, code snippets, Boolean satisfiability (SAT/SMT) queries, and so on. These example element types are not intended to be limiting and any number of element types may be envisioned.

If any sensitive or confidential elements remain untrans-formed, as indicated by a positive exit from 430, the process may proceed to step 440. Otherwise, if no sensitive or confidential elements remain untransformed, as indicated by a negative exit from 430, the process may proceed to step 450.

As shown in step 440, an anonymizing transform may be iteratively applied to an untransformed, sensitive element to provide anonymity with the assistance of anonymization rules, such as anonymization information 108 of FIG. 1, in some embodiments. These rules 18 may be obtained from the client, in various embodiments. The identified data element may be iteratively transformed and application modeler configured with the transformed element to verify that the symptom remains reproducible.

Once elements identified as sensitive or confidential have been obfuscated to the extent possible while preserving the ability to reproduce the desired symptom, as shown in 450 the modified data set may be prepared for export, on behalf of the client, along with a report, in some embodiments. As some data elements may not be successfully anonymized or may be only partly obscured, the report may be generated to include a confidence measure. This confidence measure may include a size minimization guarantee which implies that removing any segment from the obfuscated input no longer produces the same error; an information leakage estimate and an information content score which measures the sur-prise value of an obfuscated outcome against a large bench-mark of down-classified data. The modified data set ensures that if a system exhibits a specific symptom, the same system configured with the modified data set will also exhibit the system, reducing time to fix critical issues. The modified data set and generated report with confidence measure may then be exported on behalf of the client, in some embodiments.

Figure 5:
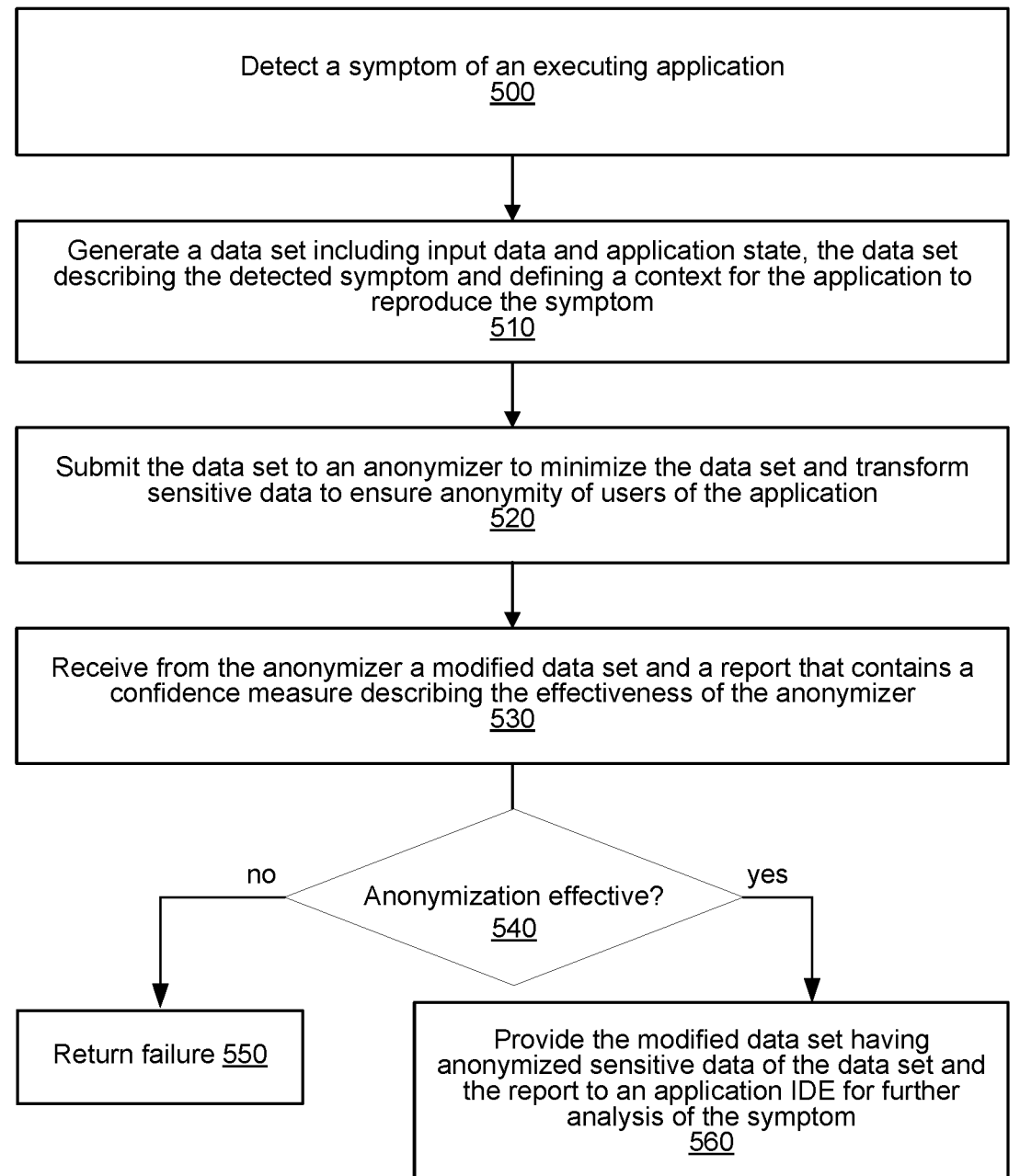
FIG. 5 illustrates a flowchart describing minimal trust debugging by a software development system that employs an anonymizer, in some embodiments.

FIG. 5 illustrates a flowchart describing minimal trust debugging by a software development system that employs an anonymizer, in some embodiments. As shown in 500, the process begins when a symptom of and executing applica-tion, such as the deployed application 200 of FIG. 2, may be detected, in some embodiments. Examples of such execution symptoms may include a processor exception, memory access exception or other execution exception or a detected performance issue such as memory consumption, processor consumption, other resource consumption or an execution latency condition. These, however, are merely examples of execution symptoms and are not intended to be limiting.

Responsive to detecting the condition as shown in 510, a data set, such as the data set 130 of FIG. 1, may be generated including input data, such as the data inputs 204 of FIG. 2, for the application and application state, such as the application state 202 of FIG. 2, in some embodiments. The generated data set may describe the detected symptom and define a context for the application such that the detected symptom may be reproducible, in some embodiments.

Then as shown in 520, the data set may then be submitted to an anonymizer to minimize the data set and transform sensitive data to ensure anonymity of users of the application. This anonymization process is discussed in further detail above in FIGS. 1 and 4.

As shown in 530, a modified data set may then be received from the anonymizer along with a report that contains a confidence measure describing the effectiveness of the anonymizer. This report may be generated by a report generator of the anonymizer, such as the reporter 106 as shown in FIG. 1. This confidence measure may include a size minimization guarantee which implies that removing any segment from the obfuscated input no longer produces the same error; an information leakage estimate and an information content score which measures the surprise value of an obfuscated outcome against a large benchmark of down-classified data. The modified data set ensures that if a system exhibits a specific symptom, the same system configured with the modified data set will also exhibit the system, reducing time to fix critical issues.

As shown in 540, a determination may then be may if anonymization is sufficiently effective to protect privacy of user data according to the received confidence measure. If anonymization is determined to be sufficiently effective, as indicated by a positive exit from 540, the process may advance to 560. If anonymization is determined to be insufficiently effective, as indicated by a negative exit from 540, the process may advance to 550 where a failure indication may be returned.

As shown in 560, upon determination that anonymizing is effective, the modified data set may be provided to an application development tool such as a debugger or integrated development environment (IDE), such as the IDE 220 of FIG. 2, for further analysis of the detected symptom.

Figure 6:
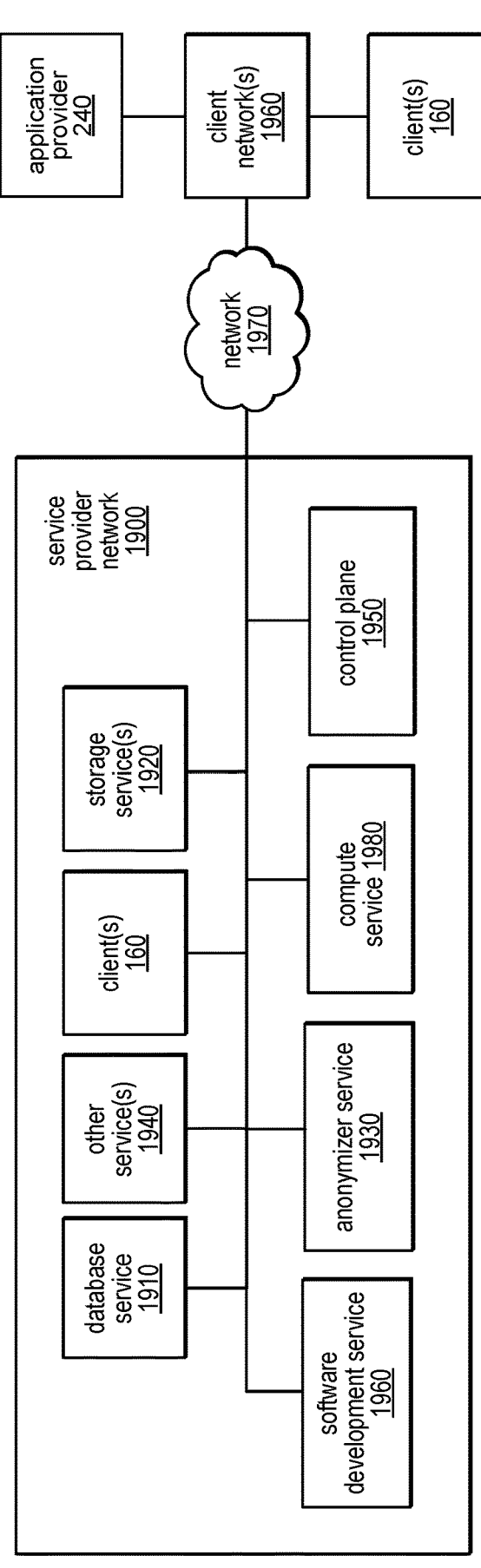
FIG. 6 illustrates an example provider network environment, according to at least some embodiments.

FIG. 6 illustrates an example provider network environment, according to at least some embodiments. In the illustrated embodiment, software development service 1960 and anonymizer service 1930 are services provided by service provider network 1900.

Service provider network 1900 is illustrated as providing numerous other services 1940, such as, but not limited to, a database service 1910 (providing relational, non-relational database services, or both), storage service(s) 1920 (e.g., key-value store, short-term, long-term, or the like, etc.), compute service 1980 (e.g., providing virtual computing capabilities), anonymizer service 1930 (e.g. providing data translation capabilities described herein) and other services 1940 as well as and clients 160. Clients 160 are illustrated as both external (communicably coupled via client networks 1960 and intermediate network 1970 (e.g., the Internet or similar) to the service provider network) and internal to the service provider network. In some embodiments, one of the services of the service provider network may be a client of another one of the services.

Service provider network 1900 may be formed as a number of regions, where a region is a separate geographical area in which the cloud provider clusters data centers. Each region may include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the service provider network 1900 via a publicly accessible network (e.g., the Internet, a cellular communication network). Regions are connected to a global network which includes private networking infrastructure (e.g., fiber connections controlled by the cloud provider) connecting each region to at least one other region. The service provider network 1900 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the service provider network 1900 to provide low-latency resource access to customers on a global scale with a high degree of fault tolerance and stability.

The traffic and operations of the cloud provider network may broadly be subdivided into two categories in various embodiments: control plane operations carried over a logical control plane 1950 and data plane operations carried over a logical data plane. While the data plane represents the movement of user data through the distributed computing system, the control plane 1950 represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, service provider network 1900 may include the hardware (e.g., modems, routers, switches, load balancers, proxy servers, etc.) and software (e.g., protocol stacks, accounting software, firewall/security software, etc.) necessary to establish a networking links between different components of service provider network 1900, such as computation and storage hosts, control plane components as well as external networks, such as network (e.g., the Internet). In some embodiments, service provider network 1900 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 160 may be attached to the overlay network so that when a client provides an IP address that they want to send packets to, the IP address is run in virtual space by communicating with a mapping service that knows where the IP overlay addresses are.

Figure 7:
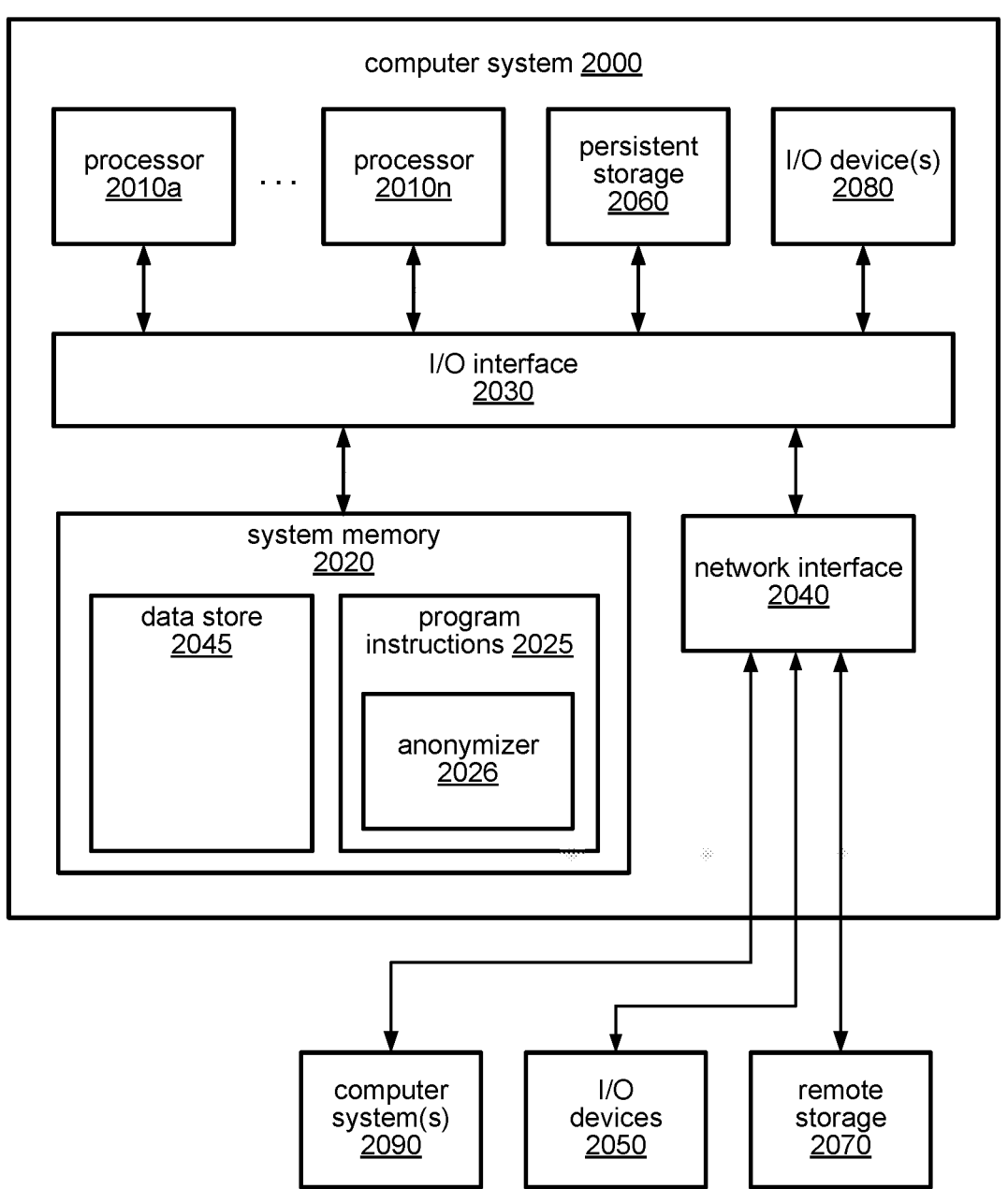
FIG. 7 is a block diagram illustrating an example computing device that may be used in at least some embodiments.

Any of various computer systems may be configured to implement processes associated with a technique for multi-region, multi-primary data store replication as discussed with regard to the various figures above. FIG. 7 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 7 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for anonymizer as indicated at 2026, for the downloadable software or provider network are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example.

Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of a database migration service and deployment as described herein may be executed on one or more computer systems, which may interact with various other devices. FIG. 7 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more processors; and a memory storing program instructions that, when executed on the one or more processors, implement an anonymizer configured to receive, from a client, a data set comprising a plurality of data objects for an executable application comprising an execution symptom, and responsive to receiving the data set:

model, by an application modeler, the executable application to identify a confidential data object of the plurality of data objects according to one or more sensitivity rules provided by the client, wherein the execution symptom is reproducible by the application modeler according to the received data set, and wherein the execution symptom is irreproducible by the application modeler according to a subset of the received data set excluding the confidential data object;

apply an anonymizing transformation to the confidential data object to generate an anonymized data object according to the one or more transformation rules provided by the client;

replace the confidential data object with the anonymized data object in the data set to generate an anonymized data set, wherein the execution symptom is reproducible by simulation of the executable application according to the anonymized data set;

identify one or more data objects of the plurality of data objects, wherein the execution symptom is reproducible by simulation of the executable application according to a subset of the received data set excluding the one or more data objects;

remove the one or more data objects from the anonymized data set; and export the anonymized data set on behalf of the client.

2. The system of claim 1, wherein the execution symptom is:

a processor exception detected during execution of the executable application when configured according to the data set; or a performance condition detected during execution of the executable application when configured according to the data set.

3. The system of claim 1, wherein to export the anonymized data set on behalf of the client, the anonymizer is configured to provide the anonymized data set to:

an application debugger on behalf of the client;

an integrated development environment on behalf of the client; or a code profiler for the executable application on behalf of the client.

4. The system of claim 1, wherein the anonymizer is provided by an anonymizing service of a provider network, and wherein the anonymized data set is exported to an application development service of the provider network, wherein the executable application is executed by the client of the application provider; wherein the application provider is another client of the application development service of the provider network, and wherein the sensitivity specification identifies confidential data of one or more users of the application of the application provider, the one or more users anonymized by the anonymizing transformation.

5. A method, comprising:
receiving, from a client, a data set comprising a plurality of data objects for a system comprising a state, and responsive to receiving the data set:
modeling, by an application modeler, the executable application to identify a sensitive data object of the plurality of data objects according to a sensitivity specification provided by the client, wherein the state is reproducible by the modeling according to the received data set, and wherein the state is irreproducible by the modeling according to a subset of the received data set excluding the sensitive data object;
applying an anonymizing transformation to the sensitive data object to generate an anonymized data object according to the sensitivity specification provided by the client;
replacing the sensitive data object with the anonymized data object in the data set to generate an anonymized data set, wherein the state is reproducible by simulation of the system according to the anonymized data set; and
exporting the anonymized data set on behalf of the client.

6. The method of claim 5, further comprising performing, responsive to receiving the data set:
identifying one or more data objects of the plurality of data objects, wherein the modeler reproduces the state when configured to simulate the system according to a subset of the received data set excluding the one or more data objects; and
removing the one or more data objects from the anonymized data set.

7. The method of claim 5, wherein the system comprises an executable application, wherein the state of the system comprises an execution symptom of the executable application, and wherein the plurality of data objects individually comprise values of respective data objects within the executable application.

8. The method of claim 7, wherein the execution symptom is a processor exception detected during execution of the executable application when configured according to the data set.

9. The method of claim 7, wherein the execution symptom is an execution latency condition detected during execution of the executable application when configured according to the data set.

10. The method of claim 7, wherein exporting the anonymized data set on behalf of the client comprises providing the anonymized data set to an application debugger on behalf of the client.

11. The method of claim 5, wherein exporting the anonymized data set on behalf of the client comprises providing the anonymized data set to a code profiler for the executable application on behalf of the client.

12. The method of claim 5, wherein generating the anonymized data set is performed by an anonymizing service of a provider network, and wherein the anonymized data set is exported to an application development service of the provider network.

13. The method of claim 5, wherein the client is a client of an application provider, wherein the system comprises an application provided by the application provider and executed by the client; wherein the application provider is another client of the application development service of the provider network, and wherein the sensitivity specification identifies confidential data of one or more users of the application of the application provider, the one or more users anonymized by the anonymizing transformation.

14. One or more non-transitory computer-accessible storage media storing program instructions that when executed on or across one or more computing devices cause the one or more computing devices to implement an anonymizer to perform:
receiving, from a client, a data set comprising a plurality of data objects for a production system comprising a state, and responsive to receiving the data set:
modeling, by an application modeler, the executable application to identify a confidential data object of the plurality of data objects according to a sensitivity specification provided by the client, wherein the state is reproducible by the modeling according to the received data set, and wherein the state is irreproducible by the modeling according to a subset of the received data set excluding the confidential data object;
applying an anonymizing transformation to the confidential data object to generate an anonymized data object according to the sensitivity specification provided by the client;
replacing the confidential data object with the anonymized data object in the data set to generate an anonymized data set, wherein the state is reproducible by simulation of the production system according to the anonymized data set; and
exporting the anonymized data set on behalf of the client.

15. The one or more non-transitory computer-accessible storage media of claim 14, the anonymizer further performing responsive to receiving the data set:
identifying one or more data objects of the plurality of data objects, wherein the development system reproduces the state when configured to simulate the production system according to a subset of the received data set excluding the one or more data objects; and
removing the one or more data objects from the anonymized data set.

16. The one or more non-transitory computer-accessible storage media of claim 14, wherein the production system comprises an executable application, wherein the state comprises an execution symptom of the executable application, and wherein the plurality of data objects individually comprise values of respective data objects within the executable application.

17. The one or more non-transitory computer-accessible storage media of claim 14, wherein the production system comprises an executable application, wherein exporting the anonymized data set on behalf of the client comprises providing the anonymized data set to an application debugger on behalf of the client.

18. The one or more non-transitory computer-accessible storage media of claim 14, wherein exporting the anonymized data set on behalf of the client comprises providing the anonymized data set to a code profiler for the executable application on behalf of the client.

19. The one or more non-transitory computer-accessible storage media of claim 14, wherein the anonymizer is an anonymizing service of a provider network, and wherein the anonymized data set is exported to an application development service of the provider network.

20. The one or more non-transitory computer-accessible storage media of claim 14, wherein the client is a client of an application provider, wherein the production system comprises an application provided by the application provider and executed by the client; wherein the application provider is another client of the application development service of the provider network, and wherein the sensitivity specification identifies confidential data of one or more users of the application of the application provider, the one or more users anonymized by the anonymizing transformation.

\* \* \* \* \*